(12) United States Patent
Reznar

(10) Patent No.: US 7,377,738 B2
(45) Date of Patent: May 27, 2008

(54) VEHICLE TIRE CARRIER ACTUATOR AND RETRIEVER

(75) Inventor: Jason Reznar, Redford, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 306 days.

(21) Appl. No.: 10/897,044

(22) Filed: Jul. 22, 2004

(65) Prior Publication Data

US 2006/0045688 A1  Mar. 2, 2006

(51) Int. Cl.
*B62D 43/00* (2006.01)
(52) U.S. Cl. ..................................... 414/463
(58) Field of Classification Search ............... 414/466, 414/463
See application file for complete search history.

(56) References Cited

U.S. PATENT DOCUMENTS 5,779,386 A * 7/1998 Eichhorn ................. 403/329
6,267,546 B1 * 7/2001 Oxyer et al. ............. 414/463
6,685,207 B1 * 2/2004 Blake ....................... 280/282

* cited by examiner

Primary Examiner—Saul J. Rodriguez
Assistant Examiner—Joshua I Rudawitz
(74) Attorney, Agent, or Firm—Gregory J. Cohan; Banner & Witcoff, Ltd.; Dean B. Watson

(57) ABSTRACT

A motor vehicle tire carrier actuator and retriever includes a first elongate member having a first end configured to mate with a rotatable shaft of a tire carrier. A second elongate member has a first end and a second end, with an aperture formed in a central portion of the second elongate member to receive a second end of the first elongate member to form a T-shaped actuator for the tire carrier in a first configuration. A recess is formed in the first end to receive the second end of the first elongate member in a second configuration to form a retriever for a tire positioned beneath a vehicle. A flange is formed at the second end of the second elongate member to grasp a tire beneath the vehicle in the second configuration.

20 Claims, 3 Drawing Sheets

VEHICLE TIRE CARRIER ACTUATOR AND RETRIEVER

FIELD OF THE INVENTION

This invention relates generally to a motor vehicle tire carrier actuator, and, in particular, to a motor vehicle tire carrier actuator that also functions as a tire retriever.

BACKGROUND OF THE INVENTION

Many motor vehicles are known to have a tire carrier that mounts the vehicle's spare tire beneath the vehicle, such as beneath the passenger compartment or trunk of a passenger car or beneath the bed of a truck. The spare tire is secured to the vehicle with a mechanism such as a winch that allows the tire to be raised and lowered. To release and secure the tire to the vehicle, a shaft on the tire carrier is rotated from above. Such vehicles are typically provided with a tire carrier actuator that has a first end that is configured to mate with the rotatable drive shaft. The release the tire, the user connects the first end of the actuator to the shaft and rotates the actuator with a handle connected to the second end of the actuator. Once the tire is released from the tire carrier it is on the ground beneath the vehicle and must be retrieved by the user.

It is an object of the present invention to provide a tire carrier actuator that reduces or overcomes some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

The principles of the invention may be used to advantage to provide tire carrier actuator that also acts as a retriever to help the user retrieve the tire from beneath the vehicle once it has been released from the tire carrier. In accordance with a first preferred embodiment, a motor vehicle tire carrier actuator and retriever includes a first elongate member having a first end configured to mate with a rotatable shaft of a tire carrier. A second elongate member has a first end and a second end, with an aperture formed in a central portion of the second elongate member to receive a second end of the first elongate member to form a T-shaped actuator for the tire carrier in a first configuration. A recess is formed in the first end to receive the second end of the first elongate member in a second configuration to form a retriever for a tire positioned beneath a vehicle. A flange is formed at the second end of the second elongate member to grasp a tire beneath the vehicle in the second configuration In accordance with another preferred embodiment, a motor vehicle tire carrier actuator and retriever includes an elongate member comprising a first portion and a second portion. A first end of the first portion is configured to mate with a rotatable shaft of a tire carrier, and a second end of the first portion is connected to a first end of the second portion. A handle is removably secured to the elongate member, with an aperture formed in a central portion of the handle receiving a second end of the second portion when the actuator is in a T-shaped first configuration. A recess in a first end of the handle receives the second end of the second portion when the actuator is in an elongate second configuration. A flange formed at the second end of the handle is configured to grasp a tire beneath a vehicle.

In accordance with a further embodiment, a motor vehicle tire carrier actuator and retriever includes an elongate metal member comprising a first portion and a second portion. A first end of the first portion is configured to mate with a rotatable shaft of a tire carrier, and a second end of the first portion is connected to a first end of the second portion. A handle is removably secured to the elongate member, with a first aperture formed in a central portion of the handle receiving a second end of the second portion when the actuator is in a T-shaped first configuration. A recess in a first end of the handle receives the second end of the second portion when the actuator is in a second elongate configuration. A flange formed at the second end of the handle is configured to grasp a tire beneath a vehicle.

Substantial advantage is achieved by providing a motor vehicle tire carrier actuator and retriever. In particular, certain preferred embodiments of the present invention allow a user to release a spare tire from a tire carrier beneath a vehicle with an actuator, reconfigure the actuator to form a retriever, and use the retriever to easily pull the spare tire from beneath the vehicle.

These and additional features and advantages of the, invention disclosed here will be further understood from the following detailed disclosure of certain preferred embodiments.

Figure 1:
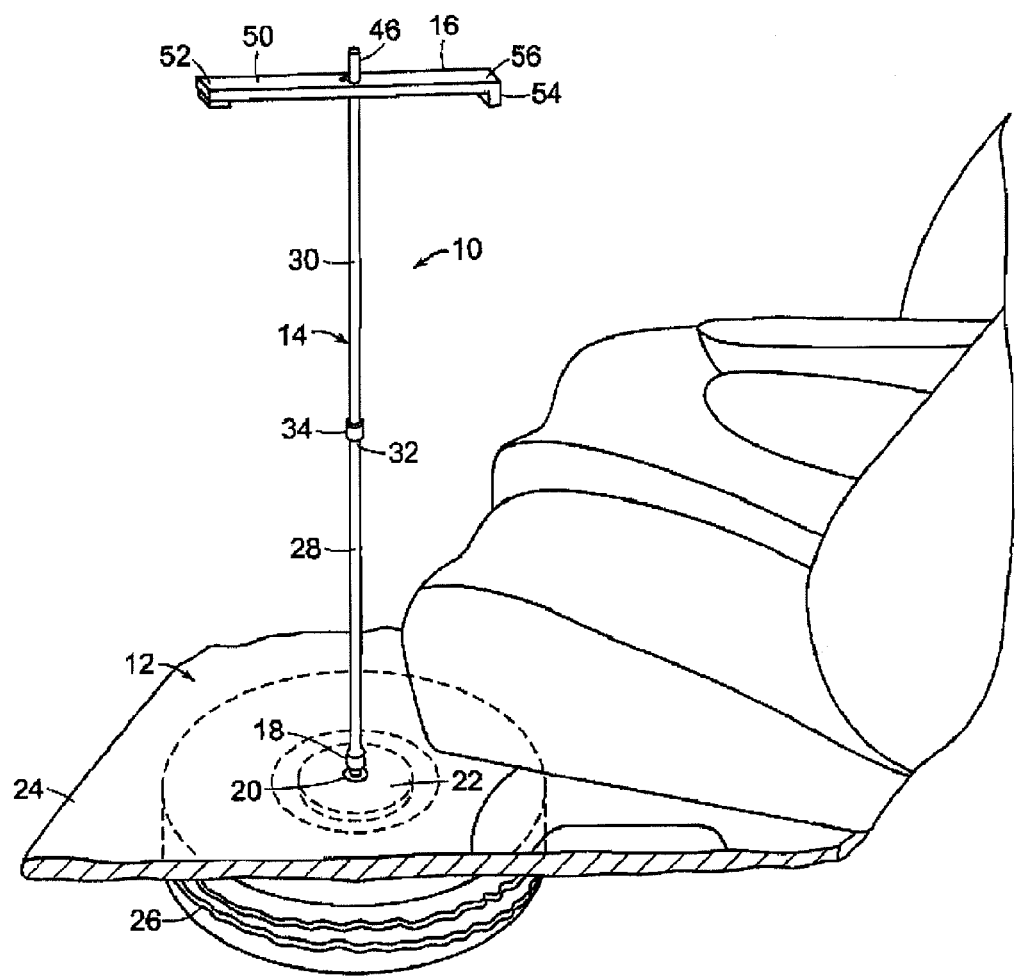
FIG. 1 is a perspective view, shown partially broken away, of a tire carrier actuator and retriever in accordance with a preferred embodiment of the present invention, shown in use in the passenger compartment of a motor vehicle in a first configuration as an actuator.

The figures referred to above are not drawn necessarily to scale and should be understood to provide a representation of the invention, illustrative of the principles involved. Some features of the motor vehicle tire carrier actuator and retriever depicted in the drawings have been enlarged or distorted relative to others to facilitate explanation and understanding. The same reference numbers are used in the drawings for similar or identical components and features shown in various alternative embodiments. Motor vehicle tire carrier actuator and retrievers as disclosed herein would have configurations and components determined, in part, by the intended application and environment in which they are used.

DETAILED DESCRIPTION OF CERTAIN PREFERRED EMBODIMENTS

The present invention may be embodied in various forms. A preferred embodiment of a motor vehicle tire carrier actuator and retriever 10 is shown in FIG. 1 in a passenger compartment 12 of a motor vehicle. In this embodiment, actuator and retriever 10 is shown in a first configuration as an actuator. Actuator 10 includes a first elongate member 14 and a second elongate member 16 removably secured to first elongate member 14. In this configuration, second elongate member 16 acts as a handle for actuator 10. A first end 18 of first elongate member 14 is attached to a rotatable shaft 20 of a tire carrier 22, which is mounted below the floorboard 24 to secure a spare tire 26 to the motor vehicle. Tire carrier 22 may include a winch or any other mechanism suitable for raising and lowering tire 26. To release tire 26, a user rotates handle 16, causing shaft 20 of tire carrier 22 to rotate and lowering tire 26 in known fashion to the ground beneath the motor vehicle.

In a preferred embodiment, first elongate member 14 is formed of a first portion 28 and a second portion 30, which serves to allow first elongate member 14 to be stored in a compact manner. It is to be appreciated that in other preferred embodiments, first elongate member 14 may be a single element, or may be formed of more than two portions. In certain preferred embodiments, first portion 28 and second portion 30 have a substantially square cross-section. However, it is to be appreciated that first portion 28 and second portion 30 could have any shaped cross-section, e.g., circular, rectangular, etc., with first end 18 configured to mate with shaft 20 of tire carrier 22. As illustrated here, shaft 20 has a substantially square profile that mates with substantially square first end 18. It is to be appreciated that shaft 20 may have other shapes, e.g., hexagonal, and that first 18 will have a profile that mates with shaft 20. In a preferred embodiment, first elongate member 14 is formed of metal, such as steel, magnesium, or aluminum.

Figure 2:
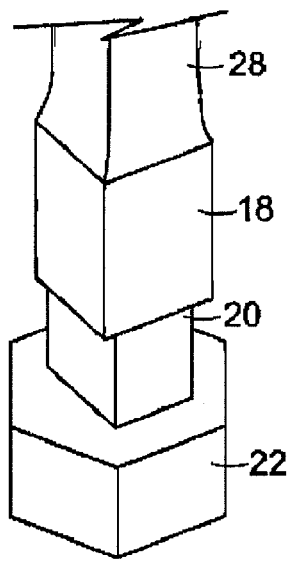
FIG. 2 is a perspective view, shown partially broken away, of the tire carrier actuator and retriever of FIG. 1, showing an end of the elongate member of the actuator connected to a drive shaft of a winch of the motor vehicle.

As seen more clearly in FIG. 2, in a preferred embodiment, first end 18 has an enlarged cross-dimension. That is, the cross-dimension, or width in this embodiment where first portion 28 has a substantially square cross-section, of first end 18 is larger than that of the remainder of first portion 28. First end 18 slips over and receives shaft 20 of tire carrier 22 (only a portion of which is illustrated here).

Figure 3:
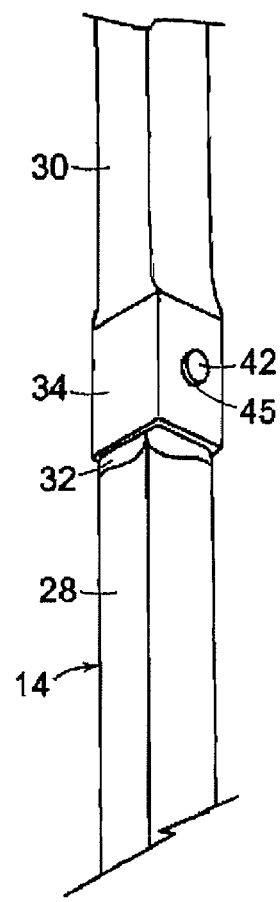
FIG. 3 is a perspective view, shown partially broken away, of the tire carrier actuator and retriever of FIG. 1, showing the connection between first and second portions of the elongate member of the actuator.
Figure 4:
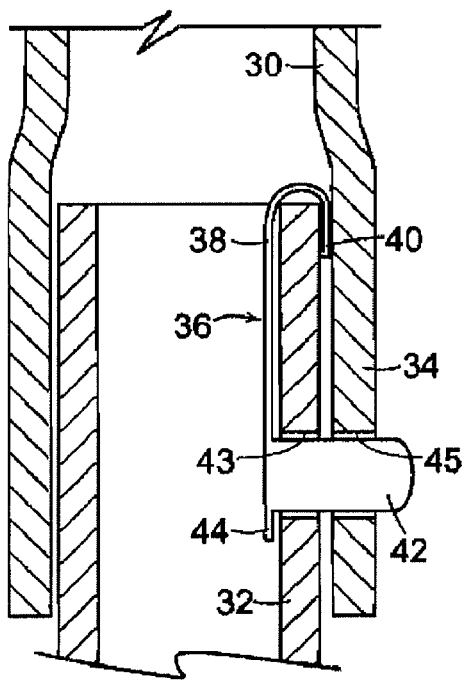
FIG. 4 is a section view, shown partially broken away, of the tire carrier actuator and retriever of FIG. 1, showing the push button snap fitting connecting the first and second portions of the elongate member of the actuator and retriever to one another.

As illustrated in FIGS. 3 and 4, a second end 32 of first portion 28 is removably secured to a first end 34 of second portion 30. In a preferred embodiment, first end 34 of second portion 30 has an enlarged cross-dimension and second end 32 has a reduced cross-dimension. This allows second end 32 to be easily received in first end 34 in slip-joint fashion. To secure first portion 28 to second portion 30, a fastener 36 is provided on second end 32 of first portion 28. In the illustrated embodiment, fastener 36 is a biasing clip 38 having a first end 40 wrapped about the peripheral edge of second end 32 and a push button 42 extending radially outwardly proximate a second end 44 of clip 38. Push button 42 extends through an aperture 43 formed in second end 32 of first portion 28 and an aperture 45 formed in first end 34 of second portion 30.

To assemble first portion 28 and second portion 30, the user depresses push button 42 and inserts second end 32 of first portion 28 into first end 34 of second portion 30 until push button 42 is biased by clip 38 to snap out through aperture 43 to engage portions 28 and 30 together. To separate first portion 28 and second portion 30, the user simply depresses push button 42 past the inner wall of second portion 30 and pulls first portion 28 and second portion 30 apart.

It is to be appreciated that in certain preferred embodiments, a fastener could be provided on first end 34 of second portion 30 rather than on second end 32 of first portion 28. It is also to be appreciated that other fasteners would be suitable for securing first portion 28 to second portion 30 including, for example, a bolt, screw, or any other quick release mechanism.

Figure 5:
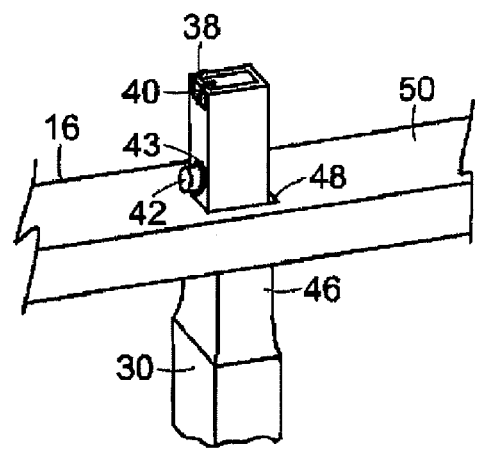
FIG. 5 is a perspective view, shown partially broken away, of the tire carrier actuator and retriever of FIG. 1, showing the connection between the elongate member of the actuator and the handle.

As noted above, handle 16 is removably secured to second portion 30 of first elongate member 14. As seen more clearly in FIG. 5, a second end 46 of second portion 30 has a reduced cross-dimension like that of second end 32 of first portion 28 (FIG. 4). A fastener 36 such as the one described above in connection with FIGS. 3-4 is provided on second end 46. An aperture 48 is provided in a central portion of handle 16 and serves to receive second end 46 of second portion 30. To secure handle 16 to second portion 30, push button 42 is depressed and second end 46 is inserted into aperture 48 until push button 42 has passed through aperture 48, at which point it springs radially outwardly. Push button 42 is then positioned in abutting relationship with a first surface 50 of handle 16, thereby retaining handle 16 on second portion 30. In certain preferred embodiments, actuator 10 is sufficiently strong to withstand an operating torque between approximately 40 and 170 ft-lbs and preferably at least approximately 47 ft-lbs without failure or permanent deformation.

Figure 6:
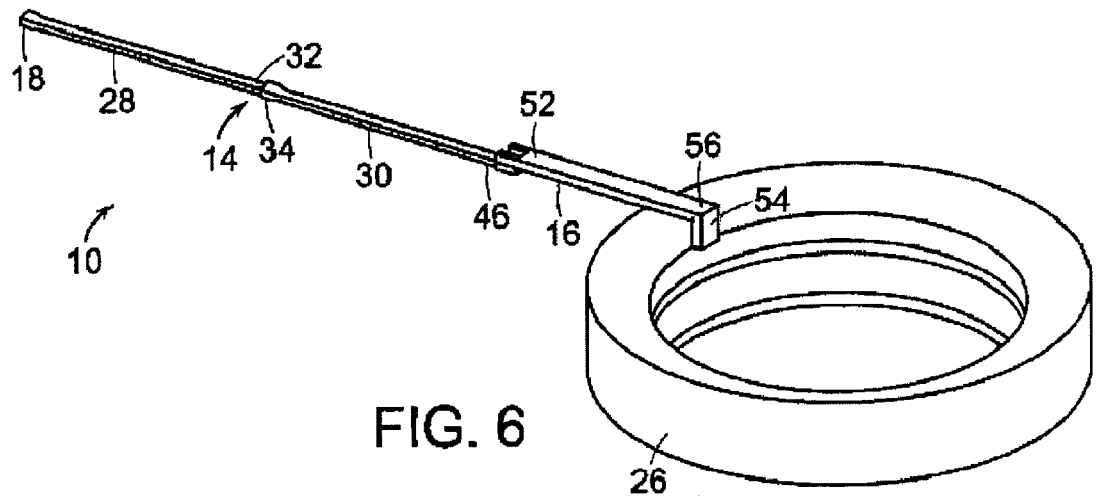
FIG. 6 is a perspective view of the tire carrier actuator and retriever of FIG. 1, shown configured as a retriever retrieving a tire.

Actuator and retriever 10 can be assembled to form a rake or retriever 10 as illustrated in FIG. 6, where retriever 10 is seen hooking tire 26 in rake-like fashion, allowing the user to easily retrieve tire 26 from beneath a vehicle without crawling beneath the vehicle. As can be seen here, first elongate member 14 is secured to a first end 52 of second elongate member 16. A flange 54 is provided at a second end 56 of second elongate member 16. Flange 54 is used to hook onto tire 26, allowing retriever 10 to act like a rake, providing an easy and effective way for a user to pull tire 26 from beneath a vehicle.

Figure 7:
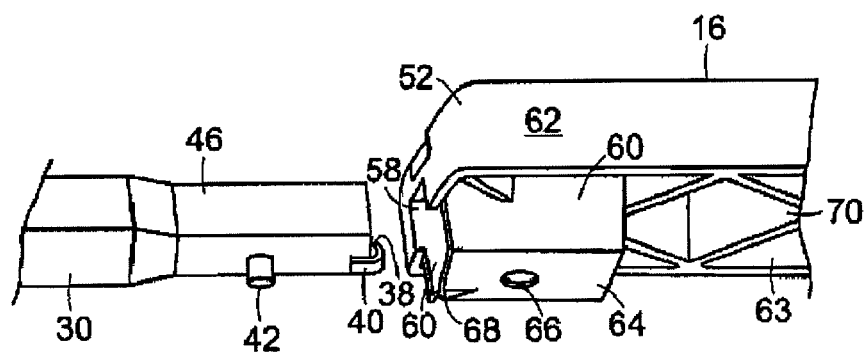
FIG. 7 is a perspective view, shown partially broken away, of the first elongate member of the tire carrier actuator and retriever prior to being connected to the second elongate member to form the retriever of FIG. 6.
Figure 8:
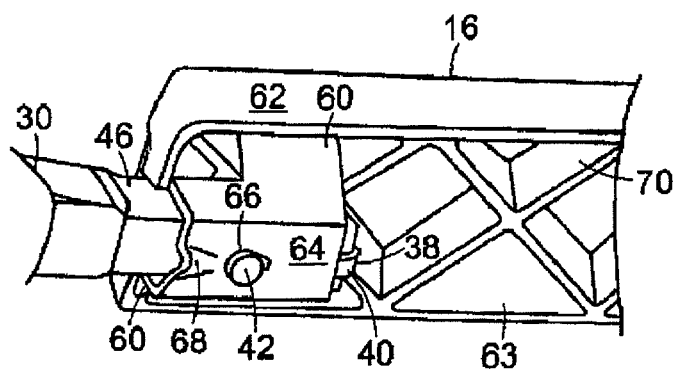
FIG. 8 is a perspective view, shown partially broken away, of the first elongate member of the tire carrier actuator connected to the second elongate member to form the retriever of FIG. 6.

The assembly of retriever 10 is illustrated in FIGS. 7-8. First end 52 of second elongate member 16 is provided with a recess 58 configured to receive first end 46 of second portion 30. As illustrated here, recess 58 is formed by a pair of opposed walls 60 extending outwardly from second elongate member 16. Opposed walls 60 are joined by a lateral wall 64, forming recess 58. An aperture 66 is formed in lateral wall 64 and serves to receive push button 42 when second end 46 is inserted into recess 58, as seen in FIG. 8. In a preferred embodiment, lateral wall 64 is provided with a groove 68 or partial indentation at its outer end, easing the insertion of push button 42 into recess 58. In certain preferred embodiments, a plurality of webs 70 are formed to bridge between opposed walls 62 and 63 of second elongate member 16, enhancing the strength and rigidity of second elongate member 16. In a preferred embodiment, second elongate member 16 is formed of plastic, e.g., nylon 6-6, thermoset plastic or other suitable plastic material well known by those skilled in the art. In certain preferred embodiments, second elongate member 16 should be strong enough to withstand a pulling force of between approximately 50 and 400 lbs., and preferably of at least approximately 100 lbs.

In a preferred embodiment, first portion 28 and second portion 30 have identical shapes, allowing a user to easily assemble actuator and retriever 10 without regard for the proper order of assembly. Thus, actuator and retriever 10 can be assembled as illustrated here and described above, or second end 46 of second portion 30 can be inserted in first end 18 of first portion 28, with first end 34 of second portion 30 receiving shaft 20 and second end 32 of first portion 28 being received in aperture 48 of handle 16.

In light of the foregoing disclosure of the invention and description of the preferred embodiments, those skilled in this area of technology will readily understand that various modifications and adaptations can be made without departing from the scope and spirit of the invention. All such modifications and adaptations are intended to be covered by the following claims.

What is claimed is:

1. A motor vehicle tire carrier actuator and retriever for a tire carrier including a rotatable shaft comprising, in combination:
   a first elongate member having a longitudinal axis and a first end configured to mate with a rotatable shaft of a tire carrier, the shaft having a longitudinal axis, the longitudinal axis of the first elongate member being substantially coaxial with the longitudinal axis of the shaft when the first elongate member and the shaft are mated together; and
   a second elongate member having a first end and a second end, an aperture formed in a central portion of the second elongate member to receive a second end of the first elongate member to form a T-shaped actuator for the tire carrier in a first configuration, a recess formed in the first end of the second elongate member to receive the second end of the first elongate member in a second configuration to form a retriever for a tire positioned beneath a vehicle, and a flange formed at the second end of the second elongate member to grasp a tire beneath the vehicle in the second configuration.

2. The motor vehicle tire carrier actuator and retriever of claim 1, wherein the first elongate member is formed of a first portion and a second portion, a first end of the first portion configured to receive the rotatable shaft of the tire carrier, a first end of the second portion connected to a second end of the first portion, and a second end of the second portion received by the second elongate member.

3. The motor vehicle tire carrier actuator and retriever of claim 2, wherein the second end of the second portion includes a snap fitting comprising a clip folded over the second end of the second portion and a push button extending outwardly from the clip, the push button extending through an aperture in the second portion and abutting a surface of the second elongate member to retain the second elongate member on the first elongate member in the first configuration.

4. The motor vehicle tire carrier actuator and retriever of claim 3, further comprising an aperture formed in the recess of the second elongate member that receives the push button in the second configuration.

5. The motor vehicle tire carrier actuator and retriever of claim 1, wherein the first elongate member and the second elongate member each have a substantially square cross-section.

6. The motor vehicle tire carrier actuator and retriever of claim 1, wherein the first elongate member is formed of metal.

7. The motor vehicle tire carrier actuator and retriever of claim 1, wherein the second elongate member is formed of plastic.

8. A motor vehicle tire carrier actuator and retriever for a tire carrier including a rotatable shaft comprising, in combination:
   a first elongate member formed of a first portion having a longitudinal axis, and a second portion, a first end of the first portion configured to receive the rotatable shaft of the tire carrier, a first end of the second portion connected to a second end of the first portion, and a second end of the second portion received by the second elongate member, the shaft having a longitudinal axis, the longitudinal axis of the first portion being substantially coaxial with the longitudinal axis of the shaft when the first portion receives the shaft; and
   a second elongate member having a first end and a second end, an aperture formed in a central portion of the second elongate member to receive a second end of the first elongate member to form a T-shaped actuator for the tire carrier in a first configuration, a recess formed in the first end of the second elongate member by a pair of opposing walls extending outwardly from the second elongate member and joined to one another by a lateral wall, the recess receiving the second end of the first elongate member in a second configuration to form a retriever for a tire positioned beneath a vehicle, and a flange formed at the second end of the second elongate member to grasp a tire beneath the vehicle in the second configuration;
   wherein the second end of the second portion includes a snap fitting comprising a clip folded over the second end of the second portion and a push button extending outwardly from the clip, the push button extending through an aperture in the second portion and abutting a surface of the second elongate member to retain the second elongate member on the first elongate member in the first configuration, the push button extending through an aperture formed in the lateral wall in the second configuration.

9. The motor vehicle tire carrier actuator and receiver of claim 8, wherein a groove is formed in an end of the lateral wall.

10. A motor vehicle tire carrier actuator and retriever for a tire carrier including a rotatable shaft comprising, in combination:
    a first elongate member formed of a first portion having a longitudinal axis, and a second portion, a first end of the first portion configured to receive the rotatable shaft of the tire carrier, a first end of the second portion connected to a second end of the first portion, the second end of the first portion including a snap fitting having a push button that extends through an aperture in the first portion and engages an aperture in the second portion, the shaft having a longitudinal axis, the longitudinal axis of the first portion being substantially coaxial with the longitudinal axis of the shaft when the first portion receives the shaft; and
    a second elongate member having a first end and a second end, an aperture formed in a central portion of the second elongate member to receive a second end of the second portion of the first elongate member to form a T-shaped actuator for the tire carrier in a first configuration, a recess formed in the first end of the second elongate member to receive the second end of the first elongate member in a second configuration to form a retriever for a tire positioned beneath a vehicle, and a flange formed at the second end of the second elongate member to grasp a tire beneath the vehicle in the second configuration.

11. The motor vehicle tire carrier actuator and retriever of claim 10, wherein the snap fitting comprises a clip folded over a second end of the first portion, the push button extending radially outwardly from the clip.

12. The motor vehicle tire carrier actuator and retriever of claim 11, wherein the first end of the first portion and the first end of the second portion have an increased cross-dimension with respect to a remainder of the first and second portions, respectively, and the second end of the first portion and the second end of the second portion have a reduced cross-dimension with respect to the remainder of the first and second portions, respectively.

13. A motor vehicle tire carrier actuator and retriever for a tire carrier including a rotatable shaft comprising, in combination:
    an elongate member comprising a first portion having a longitudinal axis, and a second portion, a first end of the first portion configured to mate with a rotatable shaft of a tire carrier, a second end of the first portion connected to a first end of the second portion, the shaft having a longitudinal axis, the longitudinal axis of the first portion being substantially coaxial with the longitudinal axis of the shaft when the first portion is mated with the shaft; and
    a handle removably secured to the elongate member, an aperture formed in a central portion of the handle receiving a second end of the second portion when the actuator is in a T-shaped first configuration, a recess in a first end of the handle receiving the second end of the second portion when the actuator is in an elongate second configuration, and a flange formed at a second end of the handle configured to grasp a tire beneath a vehicle.

14. The motor vehicle tire carrier actuator and retriever of claim 13, wherein the second end of the first portion includes a snap fitting having a push button that engages an aperture in the second portion.

15. The motor vehicle tire carrier actuator and retriever of claim 14, wherein the snap fitting comprises a clip folded over a second end of the first portion, the push button extending radially outwardly from the clip.

16. The motor vehicle tire carrier actuator and retriever of claim 15, wherein the first end of the first portion and the first end of the second portion have an increased cross-dimension and the second end of the first portion and the second end of the second portion have a reduced cross-dimension.

17. A motor vehicle tire carrier actuator and retriever for a tire carrier including a rotatable shaft comprising, in combination:
    an elongate member comprising a first portion having a longitudinal axis, and a second portion, a first end of the first portion configured to mate with a rotatable shaft of a tire carrier, a second end of the first portion connected to a first end of the second portion, the shaft having a longitudinal axis, the longitudinal axis of the first portion being substantially coaxial with the longitudinal axis of the shaft when the first portion is mated with the shaft; and
    a handle removably secured to the elongate member, an aperture formed in a central portion of the handle receiving a second end of the second portion when the actuator is in a T-shaped first configuration, a recess in a first end of the handle receiving the second end of the second portion when the actuator is in an elongate second configuration, and a flange formed at the second end of the handle configured to grasp a tire beneath a vehicle, the second end of the second portion including a push button snap comprising a clip folded over the second end of the second portion and a radially outwardly extending button, the button abutting a surface of the handle to retain the handle on the elongate member in the first configuration.

18. The motor vehicle tire carrier actuator and retriever of claim 17, further comprising an aperture formed in the recess of the second elongate member that receives the push button in the second configuration.

19. The motor vehicle tire carrier actuator and retriever of claim 17, wherein the recess is formed by a pair of opposing walls extending outwardly from the second elongate member and joined to one another by a lateral wall, an aperture formed in the lateral wall to receive the push button in the second configuration.

20. A motor vehicle tire carrier actuator and retriever comprising, in combination:
    an elongate metal member comprising a first portion having a longitudinal axis, and a second portion, a first end of the first portion configured to mate with a rotatable shaft of a tire carrier, a second end of the first portion connected to a first end of the second portion, the shaft having a longitudinal axis, the longitudinal axis of the first portion being substantially coaxial with the longitudinal axis of the shaft when the first portion is mated with the shaft; and
    a handle removably secured to the elongate member, a first aperture formed in a central portion of the handle receiving a second end of the second portion when the actuator is in a T-shaped first configuration, a recess in a first end of handle receiving the second end of the second portion when the actuator is in a second elongate configuration, and a flange formed at a second end of the handle configured to grasp a tire beneath a vehicle.

* * * * *